United States Patent
Salichs et al.

(10) Patent No.: US 11,492,198 B2
(45) Date of Patent: *Nov. 8, 2022

(54) STORAGE SYSTEM AND METHODS

(71) Applicant: Signode Industrial Group LLC, Tampa, FL (US)

(72) Inventors: Rafael Salichs, Madrid (ES); Juan Carlos Tamayo, Saragossa (ES)

(73) Assignee: Signode Industrial Group LLC, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/200,276

(22) Filed: Mar. 12, 2021

(65) Prior Publication Data

US 2021/0198039 A1 Jul. 1, 2021

Related U.S. Application Data

(63) Continuation of application No. 16/733,545, filed on Jan. 3, 2020, now Pat. No. 10,974,898, which is a (Continued)

(51) Int. Cl.
*B65G 1/06* (2006.01)
*B65G 1/04* (2006.01)
*B65G 1/02* (2006.01)

(52) U.S. Cl.
CPC ............. *B65G 1/065* (2013.01); *B65G 1/026* (2013.01); *B65G 1/0492* (2013.01); *B65G 1/06* (2013.01)

(58) Field of Classification Search
CPC ........ B65G 1/026; B65G 1/0492; B65G 1/06; B65G 1/065
See application file for complete search history.

(56) References Cited

U.S. PATENT DOCUMENTS 3,250,377 A 5/1966 Joseph et al.
3,718,097 A 2/1973 La et al.
(Continued)

FOREIGN PATENT DOCUMENTS

CA 2830837 A1 9/2012
CN 1210087 A 3/1999
(Continued)

OTHER PUBLICATIONS

"International Search Report", PCT/US2012/065777 (5 pages), dated Feb. 5, 2013.
(Continued)

*Primary Examiner* — Mark C Hageman
(74) *Attorney, Agent, or Firm* — McDonnell Boehnen Hulbert & Berghoff LLP

(57) ABSTRACT

A storage system includes a rack with a plurality of layers, each layer including an aisle and a plurality of rows extending from the aisle defining storage locations for items. A shuttle usable with the rack includes a first cart movable along the aisle and a second cart configured to be carriable by the first cart and to be movable along a row. The second cart is configured to carry an item between the first cart and the storage locations. A conveyor is located on one of the first or second carts to move the item onto or off the first cart. Related methods of storing and/or retrieving items from a rack are also disclosed. A rack system is disclosed and is readily assembled without welding, transferring loading so that the weight of the rack and any item stored therein is supported by the upright elements via support brackets.

17 Claims, 16 Drawing Sheets

Related U.S. Application Data continuation of application No. 15/846,462, filed on Dec. 19, 2017, now Pat. No. 10,526,143, which is a continuation of application No. 13/680,282, filed on Nov. 19, 2012, now Pat. No. 9,850,066.

(60) Provisional application No. 61/561,895, filed on Nov. 20, 2011.

(56) References Cited

U.S. PATENT DOCUMENTS

| | | | |
|---|---|---|---|
| 3,827,365 A | 8/1974 | Coppel | |
| 3,869,028 A | 3/1975 | Sawada et al. | |
| 3,905,492 A | 9/1975 | Maeda et al. | |
| 3,973,685 A | 8/1976 | Loomer | |
| 4,218,616 A | 8/1980 | Loomer | |
| 4,229,135 A | 10/1980 | Malmros | |
| 4,328,422 A | 5/1982 | Loomer | |
| 4,459,078 A | 7/1984 | Chiantella et al. | |
| 4,856,956 A | 8/1989 | Zur | |
| 4,972,778 A | 11/1990 | Suominen | |
| 5,002,449 A | 3/1991 | Kita et al. | |
| 5,967,728 A | 10/1999 | Gales et al. | |
| 6,149,366 A | 11/2000 | Deandrea | |
| 6,213,025 B1 | 4/2001 | Sauerwein et al. | |
| 6,325,586 B1 | 12/2001 | Loy | |
| 6,652,213 B1 | 11/2003 | Mitchell et al. | |
| 7,073,634 B2 | 7/2006 | Mitchell et al. | |
| 7,261,509 B2* | 8/2007 | Freudelsperger | B65G 1/1378 414/269 |
| 7,591,630 B2 | 9/2009 | Lert | |
| 7,753,637 B2 | 7/2010 | Benedict et al. | |
| 8,260,454 B2 | 9/2012 | Checketts | |
| 8,554,643 B2 | 10/2013 | Kortelainen | |
| 8,556,564 B2 | 10/2013 | Miller | |
| 8,684,651 B2 | 4/2014 | Wang | |
| 8,721,250 B2 | 5/2014 | Razumov | |
| 8,721,251 B1 | 5/2014 | Razumov | |
| 8,833,573 B2 | 9/2014 | Tomaszewski et al. | |
| 8,876,454 B2* | 11/2014 | Koholka | B65G 1/1378 414/277 |
| 8,974,168 B2* | 3/2015 | Yamashita | B65G 1/04 414/277 |
| 9,232,856 B2 | 1/2016 | Yaniak et al. | |
| 9,334,114 B2* | 5/2016 | Salichs | B65G 1/0492 |
| 9,441,388 B2 | 9/2016 | Shani | |
| 9,643,780 B2* | 5/2017 | Salichs | B65G 1/065 |
| 9,643,781 B2 | 5/2017 | Salichs et al. | |
| 9,850,066 B2 | 12/2017 | Salichs et al. | |
| 2005/0118003 A1 | 6/2005 | Mitchell et al. | |
| 2006/0158043 A1 | 7/2006 | Brouwer et al. | |
| 2008/0208389 A1 | 8/2008 | Checketts | |
| 2008/0213073 A1 | 9/2008 | Benedict et al. | |
| 2008/0302747 A1 | 12/2008 | Nance | |
| 2009/0003981 A1 | 1/2009 | Miller | |
| 2011/0008137 A1* | 1/2011 | Yamashita | B65G 1/0492 414/267 |
| 2012/0099953 A1 | 4/2012 | Hortig et al. | |
| 2012/0177465 A1 | 7/2012 | Koholka | |
| 2013/0105428 A1 | 5/2013 | Yaniak et al. | |
| 2013/0129453 A1 | 5/2013 | Salichs et al. | |
| 2013/0180941 A1 | 7/2013 | Tomaszewski | |
| 2013/0209202 A1 | 8/2013 | Schmit et al. | |
| 2013/0276679 A1 | 10/2013 | Kroeplien et al. | |
| 2014/0072391 A1 | 3/2014 | Del Popolo | |

FOREIGN PATENT DOCUMENTS

| | | |
|---|---|---|
| CN | 2453427 Y | 10/2001 |
| CN | 1886313 A | 12/2006 |
| CN | 101711210 A | 5/2010 |
| DE | 1429530 A1 | 1/1969 |
| DE | 4205856 A1 | 10/1992 |
| EP | 0609757 A2 | 8/1994 |
| EP | 0737630 A1 | 10/1996 |
| EP | 0894740 A1 | 2/1999 |
| EP | 1086910 A1 | 3/2001 |
| EP | 1939114 A1 | 7/2008 |
| EP | 2268562 A1 | 1/2011 |
| EP | 2287093 A1 | 2/2011 |
| EP | 2327643 A1 | 6/2011 |
| EP | 2392524 A1 | 12/2011 |
| FR | 2685306 A1 | 6/1993 |
| JP | S5199387 U | 8/1976 |
| JP | S5330676 Y2 | 7/1978 |
| JP | S57126405 U | 8/1982 |
| WO | 8912592 A1 | 12/1989 |
| WO | 2009132687 A1 | 11/2009 |
| WO | 2009132730 A1 | 11/2009 |
| WO | 2011020836 A1 | 2/2011 |
| WO | 2011032654 A1 | 3/2011 |
| WO | 2011104157 A1 | 9/2011 |
| WO | 2012127419 A1 | 9/2012 |

OTHER PUBLICATIONS

"International Search Report", PCT/US2014/025068 (3 pages), dated Aug. 29, 2014.

"Satellite Warehouse Optimizes Storage Volume", F+H Fordern und Heben, vol. 42 (1 page), Jan. 1, 1992.

Cogliati, "Come movimentare il magazzino surgelato", zerosottozero, pp. 86-89, Oct. 31, 2011.

Cogliati, Giuliana, "Ti sistemo il magazzino", il latte, Tecnologia applicate, pp. 98-99, Oct. 31, 2011.

"Autosatmower Project" Recorded Web Video [online], Pallet Shuttle, Apr. 5, 2011. https://www.youtube.com/watch?v=hbMA4nZBkWU (available Mar. 23, 2011).

"Show Video: Promat 2011 Chicago" Recorded Web Video [online], Automatic Pallet Retrirval System, YouTube, Mar. 23, 2011. https://www.youtube.com/watch?v=FHRmdbFSMto.

Screen Shot of "Autosatmover" Recorded Web Video [on;ine], Pallet Shuttle, YouTube, Apr. 5, 2011.

\* cited by examiner

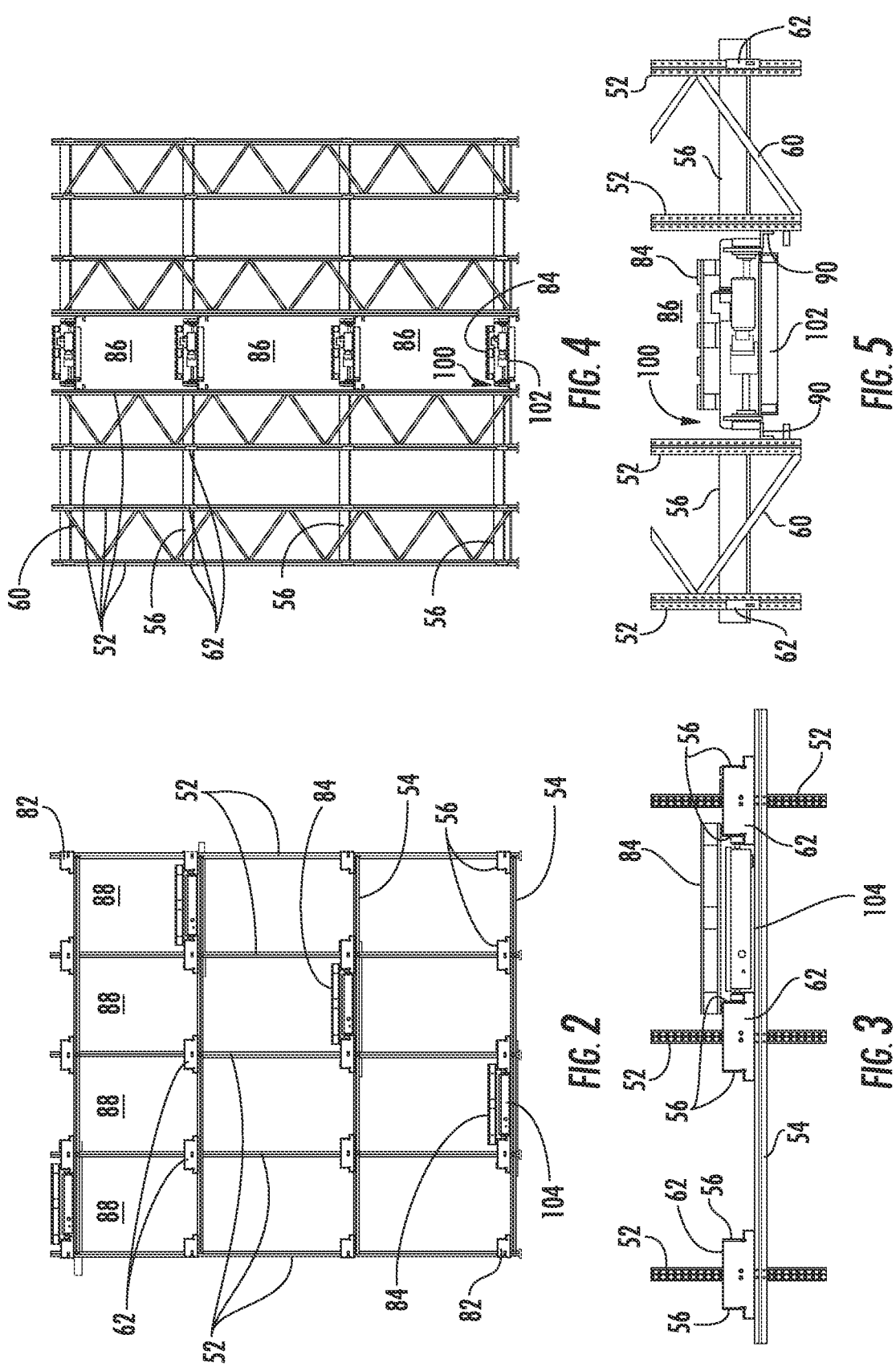

STORAGE SYSTEM AND METHODS

RELATED APPLICATIONS

This patent application is a continuation of, claims priority to and the benefit of U.S. patent application Ser. No. 16/733,545, filed on Jan. 3, 2020, which is a continuation of, claims priority to and the benefit of U.S. patent application Ser. No. 15/846,462, filed on Dec. 19, 2017, now U.S. Pat. No. 10,526,143, issued on Jan. 7, 2020, which is a continuation of, claims priority to and the benefit of U.S. patent application Ser. No. 13/680,282, filed on Nov. 19, 2012, now U.S. Pat. No. 9,850,066, issued on Dec. 26, 2017, which claims the benefit of U.S. Provisional Patent Application No. 61/561,895, filed on Nov. 20, 2011, the entire contents of each are incorporated by reference herein.

TECHNICAL FIELD

The present disclosure relates generally to storing and retrieving items in rack based systems.

BACKGROUND

Warehousing and distribution facilities have grown in importance in the supply chain in recent years. In such facilities, large warehouses are used to collect and store many types of goods at a central location for shipment by truck to one or more locations, typically retail locations. Goods may be stored in the warehouse by pallet load or individually, and goods may be shipped either by uniform pallet, mixed pallet, or otherwise. To maximize efficiency, goods are often stored in vertical rack based systems, multiplying the amount of goods that can be stored in a given amount of square footage.

Some systems, sometimes known as high density or ultra-high density rack systems, store pallets of goods in a large, multi-layer rack. Pallets are stored according to known identifiers such as SKU numbers or the like and kept track of by a computer-based system. As pallets of goods are stored in the system, the related identifiers are noted and stored in a computer memory or the like so that when the goods are desired, they can be retrieved.

Automated systems of this type use carts that place the goods in the rack and retrieve the goods when desired. Such automated systems provide efficiency in terms of floor space usage, as well as quick loading and retrieval of goods with low need for manual attention or monitoring. Various cart-based rack systems have been proposed, with one or more carts that travel from a staging area to a storage area to place and retrieve goods. Existing cart-based systems and related rack structures provide acceptable storage capabilities. However, as rack systems become larger, improvement in cart functionality and efficiency, as well as in rack design to handle larger systems, would be welcome.

SUMMARY

Aspects and advantages of the invention will be set forth in part in the following description, or may be apparent from the description, or may be learned through practice of the invention.

According to certain aspects of the present, a shuttle usable with a rack is disclosed, the rack including an aisle and a plurality of rows extending from the aisle, storage locations being located along the rows for storing an item. The shuttle includes a first cart movable along the aisle and a second cart configured to be carriable by the first cart and to be movable along a row. The second cart is configured to carry the item between the first cart and the storage locations. A conveyor located on one of the first or second carts moves the item onto or off the first cart. Again, various options and modifications are possible.

According to certain other aspects of the disclosure, a shuttle usable with a rack is disclosed, the rack an aisle and a plurality of rows extending from the aisle, storage locations being located along the rows for storing an item. The shuttle has a first cart movable along the aisle. The shuttle includes a second cart configured to be carriable by the first cart and to be movable along a row. The second cart is configured to carry the item between the first cart and the storage locations. The second cart has a raisable top platform, a first motor for moving the second cart along the rows and a second motor for selectively raising the top platform to lift an item. The top platform is raised by a camming device that rotates around a horizontal axis. Again, various options and modifications are possible.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention is set forth in the specification, which makes reference to the appended figures, in which:

FIG. 2 shows a side view of the rack system of FIG. 1;

FIG. 3 shows a closeup of a portion of the rack system as in FIG. 2

FIG. 4 shows an end view of the rack system of FIG. 1;

FIG. 5 shows a closeup of a portion of the rack system as in FIG. 4;

DETAILED DESCRIPTION

Figure 1:
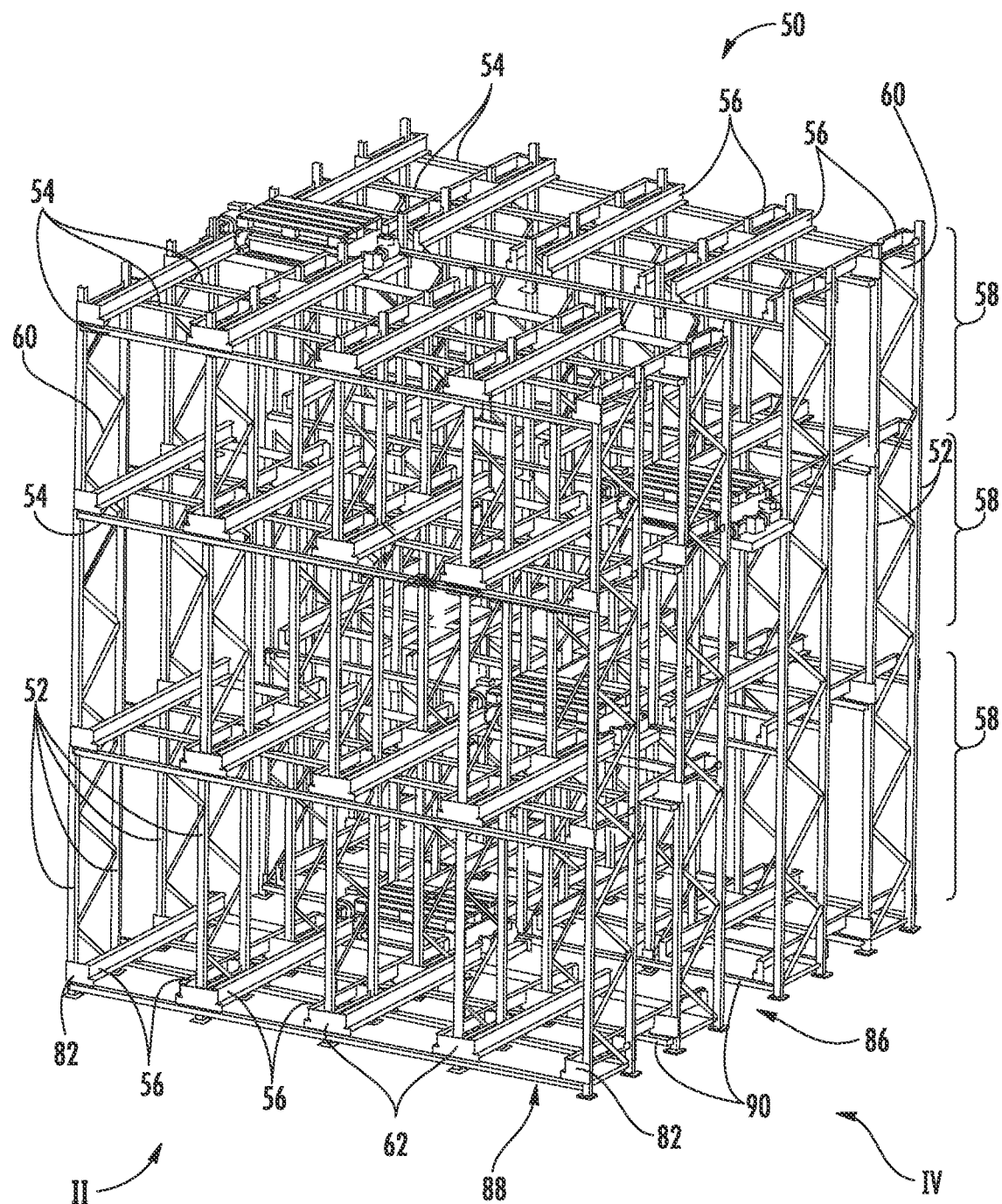
FIG. 1 shows a perspective view of a rack system according to certain aspects of the disclosure.
Figure 6:
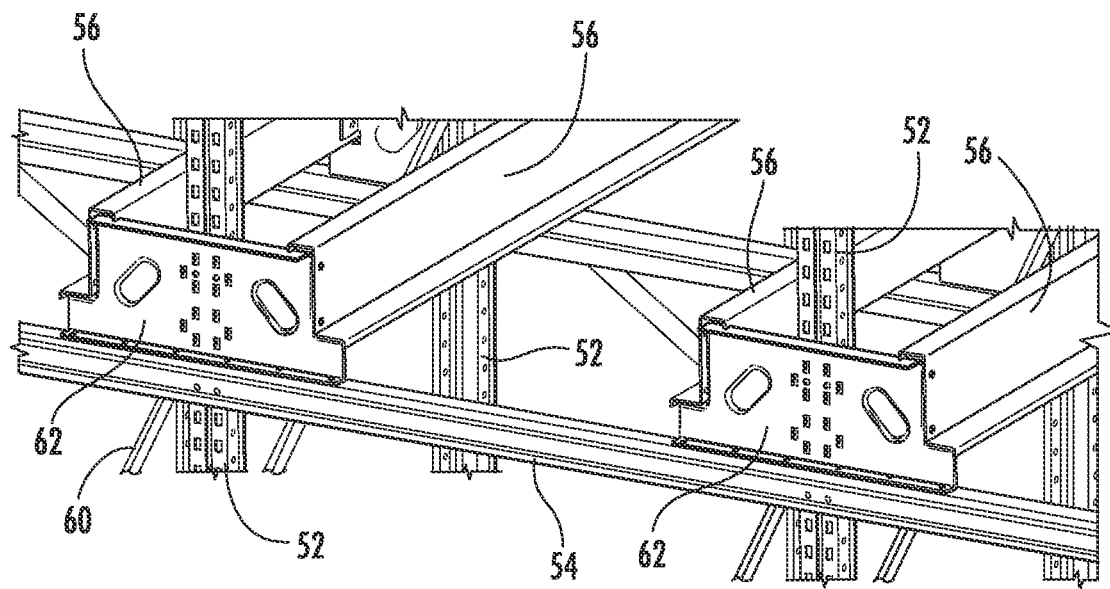
FIG. 6 shows a perspective view of a portion of the rack system of FIG. 1 showing a bracket portion.
Figure 7:
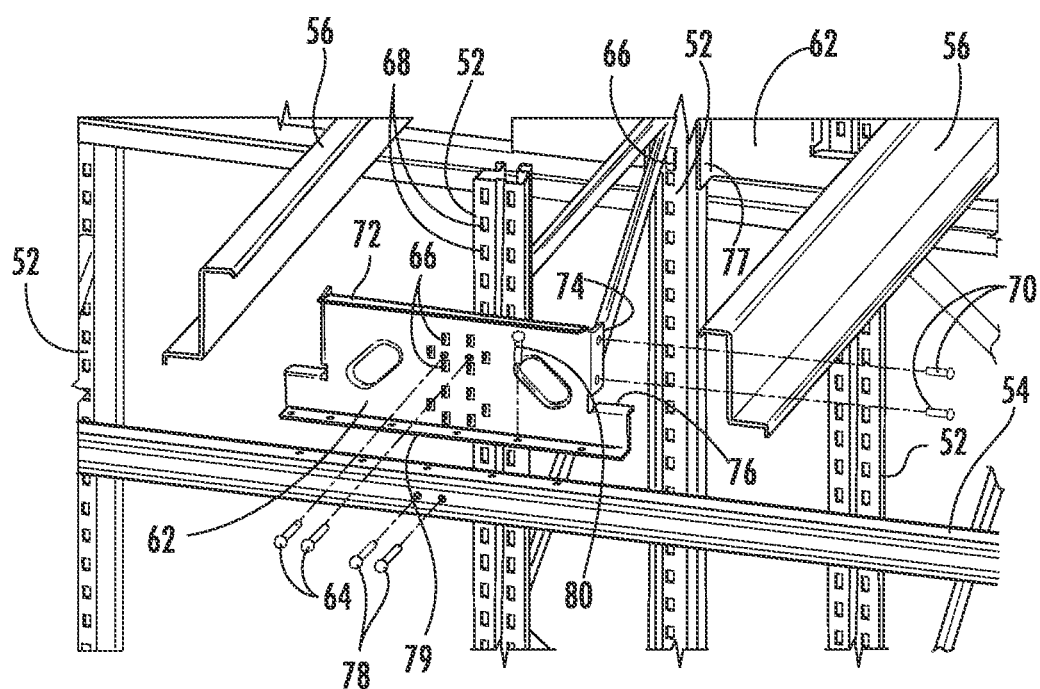
FIG. 7 shows an exploded perspective view of the elements in FIG. 6.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 20:
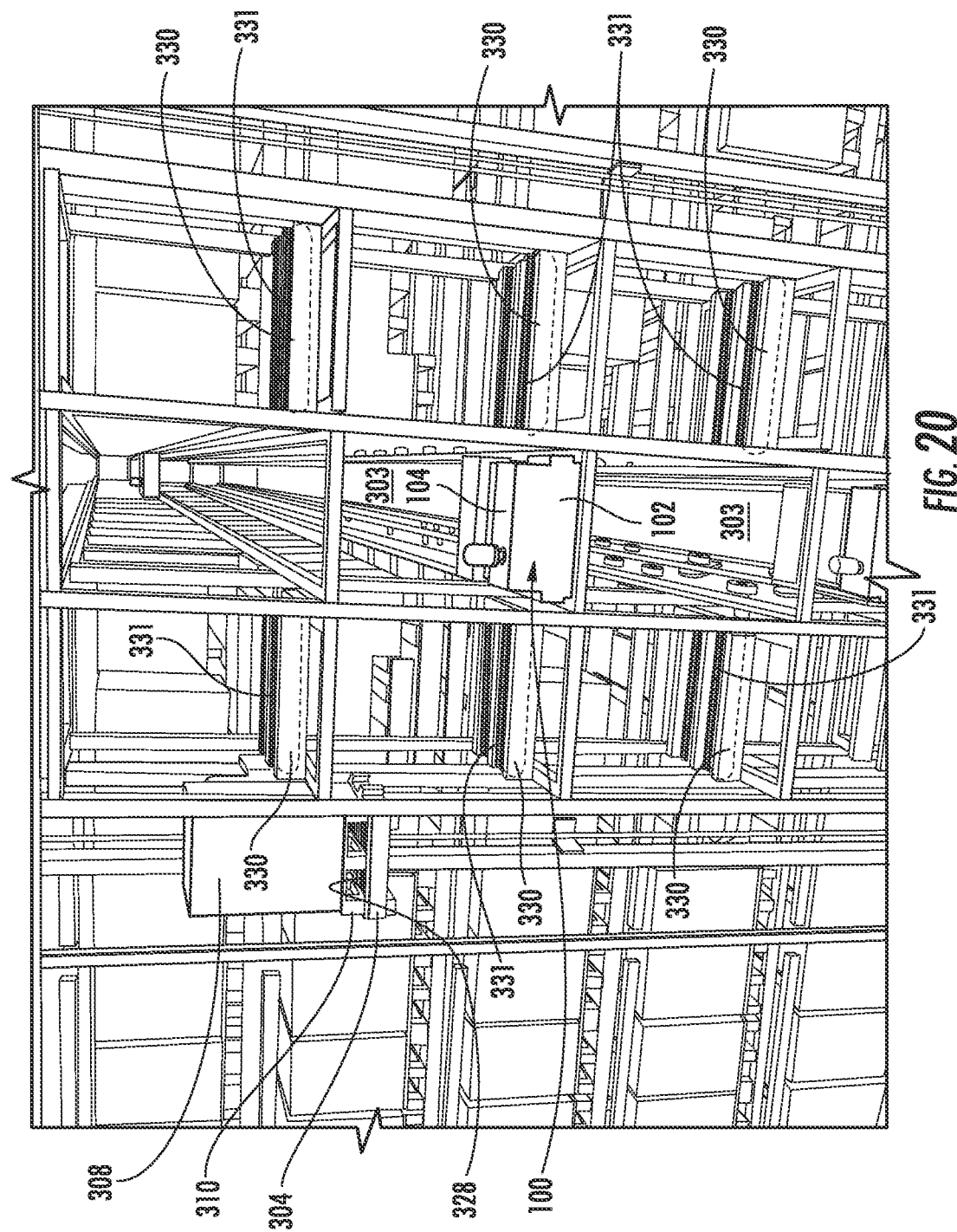
Figure 21:
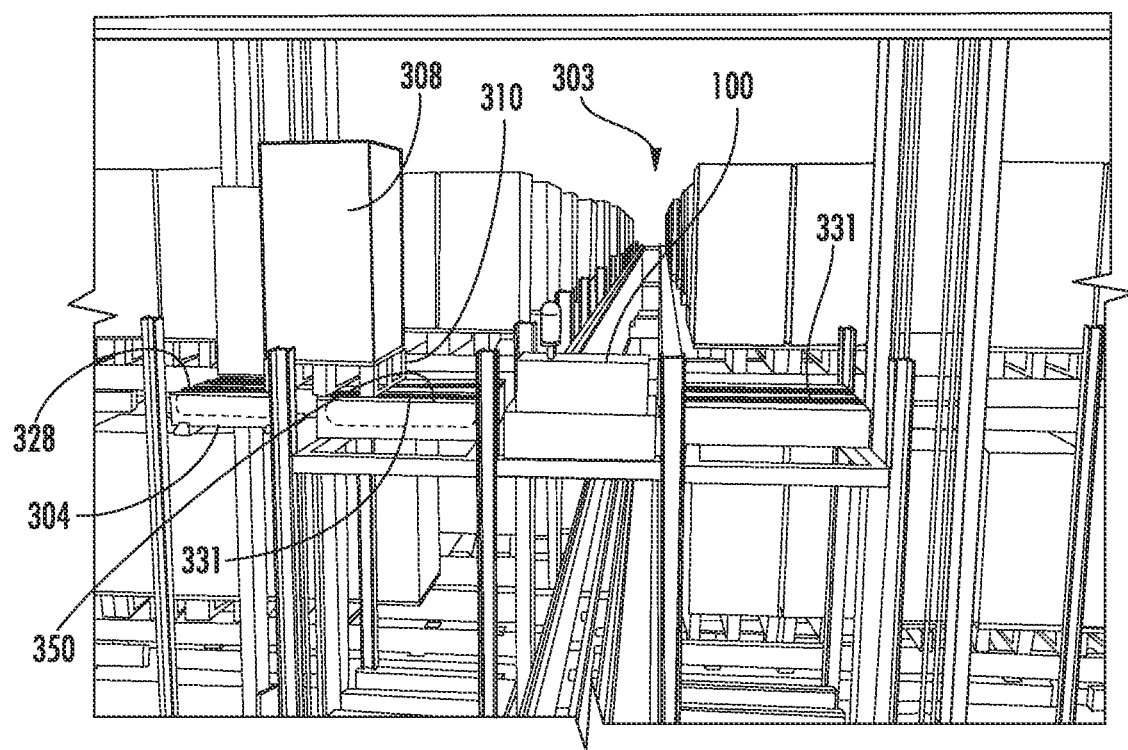

FIGS. 1-7 show an example of a rack 50 according to certain aspects of the disclosure. It should be understood that rack 50 as illustrated is but one example constructed using the present teachings. For example, rack 50 could be much larger than that shown. Also, multiple racks could be employed in a given location. Therefore, rack 50 could be a component of a larger combined automated storage system. For example, FIGS. 18-22, discussed below with reference to use of the disclosed structures, shows two side by side racks 50 substantially larger than that illustrated in FIG. 1. FIGS. 20 and 21 also show related equipment such as lifts and conveyors that will also be discussed below as part of an overall automated system. Therefore, it should be understood that the full scope of the invention includes all such modifications, extensions and variations.

As shown in FIGS. 1-7, rack 50 includes a plurality of upright elements 52 arranged in a grid, a plurality of first horizontal elements 54 extending in a first direction to connect adjacent upright elements, and a plurality of second horizontal elements 56 extending in a second direction perpendicular to the first direction. Rack 50 includes a number of layers 58 formed by such intersecting horizontal elements 54 and 56. Struts 60 may also be provided to stiffen the structure.

The upright elements 52 and horizontal elements 54 and 56 are connected via fasteners attached ultimately to a plurality of support brackets 62. Each upright element 52 has a plurality of support brackets 62 mounted to it at different heights with each height corresponding to a layer 58. Support brackets 62 are attached to upright elements 52 by fasteners 64 without welding (see FIG. 7). Also, mating tabs 66 and slots 68 may be provided for additional alignment and support assistance both during assembly and use.

Each second horizontal element 56 forms one side of a portion of a track for a row 88 to be travelled by a row cart 104, as will be described later. Accordingly, opposing elements 56 mounted to adjacent brackets 62 form such a row track (see FIG. 3). Second horizontal elements 56 are attached to brackets 62 via fasteners 70 without welding (see FIG. 7). Brackets 62 may have flanges 72,74,76 for rigidity and for aligning and attaching second horizontal elements 56, and flange 77 for aligning and attaching to upright elements 52.

First horizontal elements 54 provide spacing and support for elements within rack 50 and may be attached to upright elements 52 with fasteners 78 and to flange 79 of brackets 62 with additional fasteners 80. End brackets 82 at ends of rack 50 can be modified versions of brackets 62, designed to accept only one track element 56, if desired. Again, no welding is required. When goods are stored in rack 50, the goods are stored indiscrete predetermined locations on rows 88 formed by second horizontal elements 56. Due to the fastened-together structure of rack 50, the weight of the rack and the stored items is transferred to and supported by upright elements 52 substantially via brackets 62. Each of the above elements can be formed of a metal such as steel or aluminum, can be painted, powder coated, etc. as desired. Due to the wide variation in potential sizes and loading, one skilled in the art can readily select dimensions and materials for the elements and fasteners to meet a given application need.

Typically, items to be placed on rack 50 will be moved to and within the rack on a platform 84 such as a wood, polymer, or metal pallet, although other platforms could be used, and platforms could be avoided where large or unitized items are being moved. Accordingly, mention of moving loads, pallet loads, items or goods herein is intended to include moving items or goods on platforms or without platforms.

Items are moved within rack 50 in each layer along an aisle 86 and then along one of the rows 88. Various shuttle devices can be used for such movement into and out of the rack according to certain aspects of the disclosure (see aisle carts 102 and row carts 104 in FIGS. 2-5, discussed in greater detail below). Along aisle 86, horizontal elements 54 may be replaced with or supplemented by track elements 90 to transfer the shuttle device along the aisle. As discussed below, power can be provided to the shuttle carts 102 and 104 in various locations in the rack.

Figure 8:
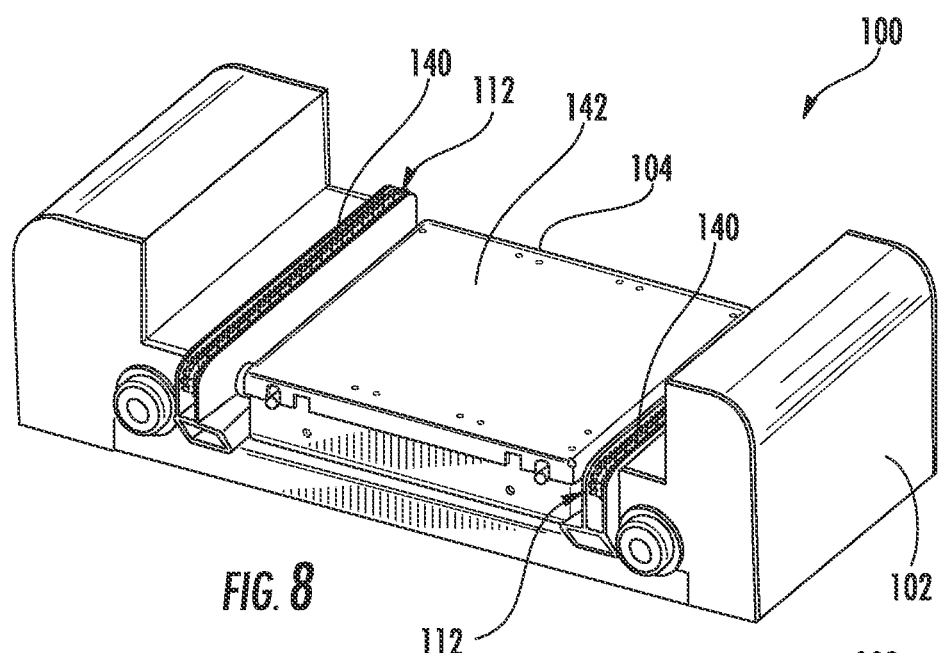
FIG. 8 shows a perspective view of a dual shuttle useful in the rack system of FIG. 1.
Figure 9:
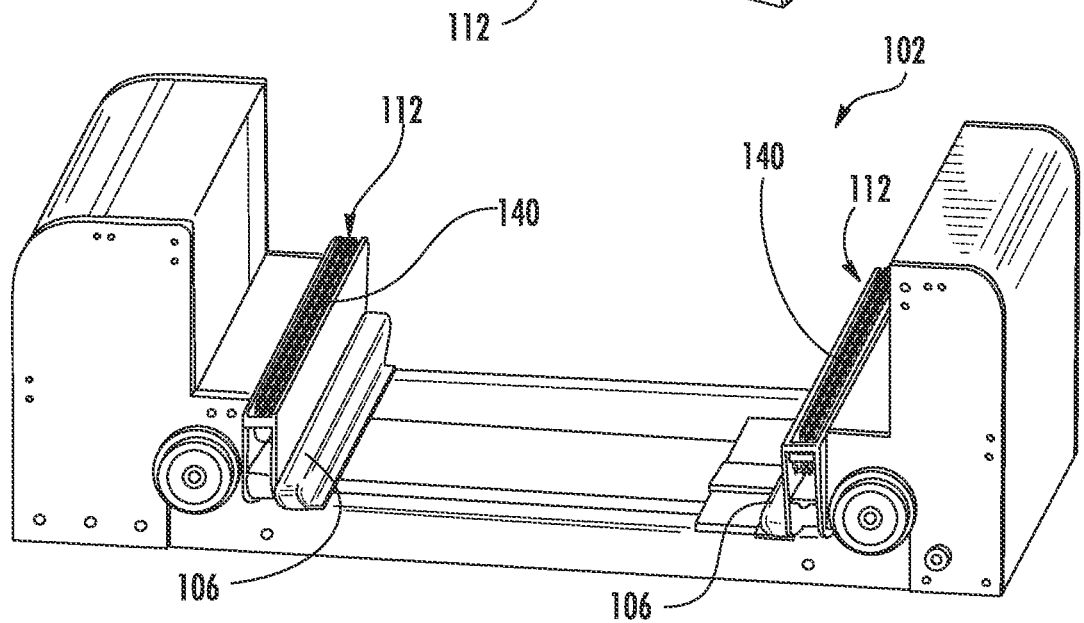
FIG. 9 shows a perspective view of a first (aisle) cart of the dual shuttle with a second (row) cart removed.
Figure 10:
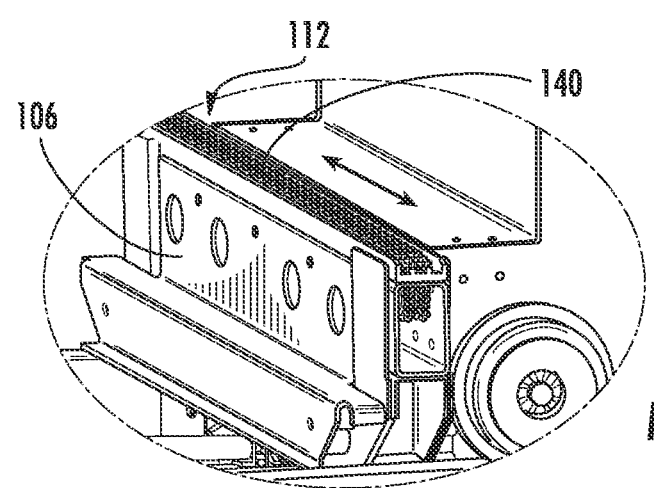
FIG. 10 shows a closeup perspective view of a portion of the aisle cart showing a chain conveyor.
Figure 11:
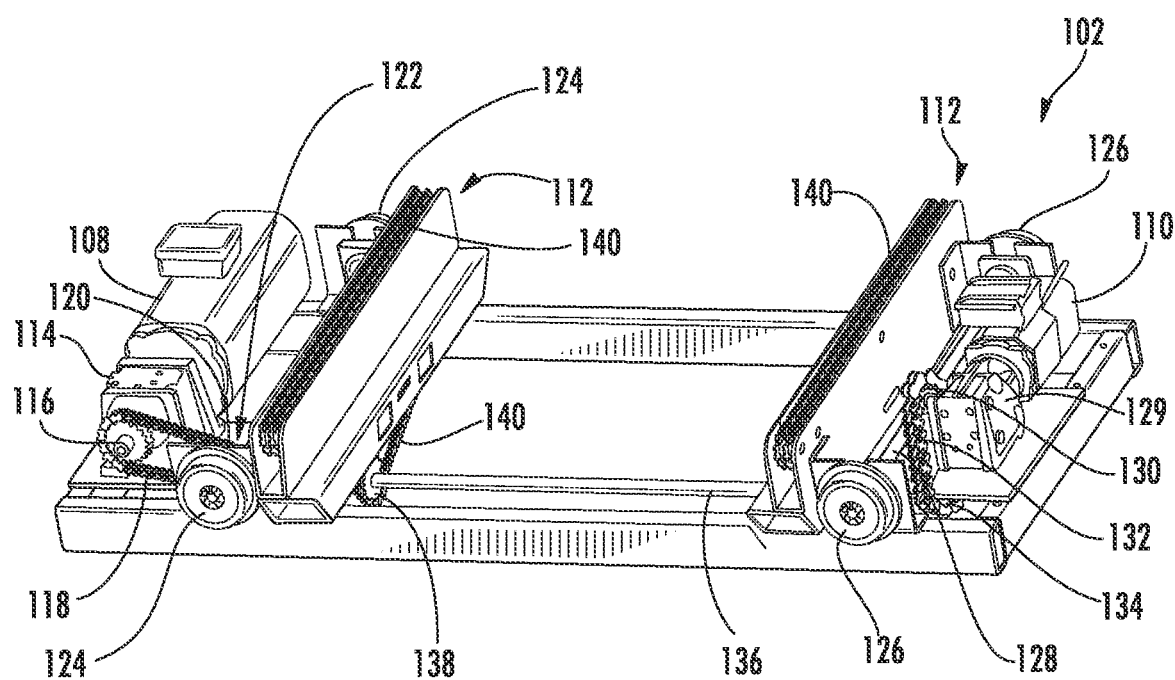
FIG. 11 shows a perspective view of the aisle cart with top housing elements removed for clarity to show internal drive elements.
Figure 12:
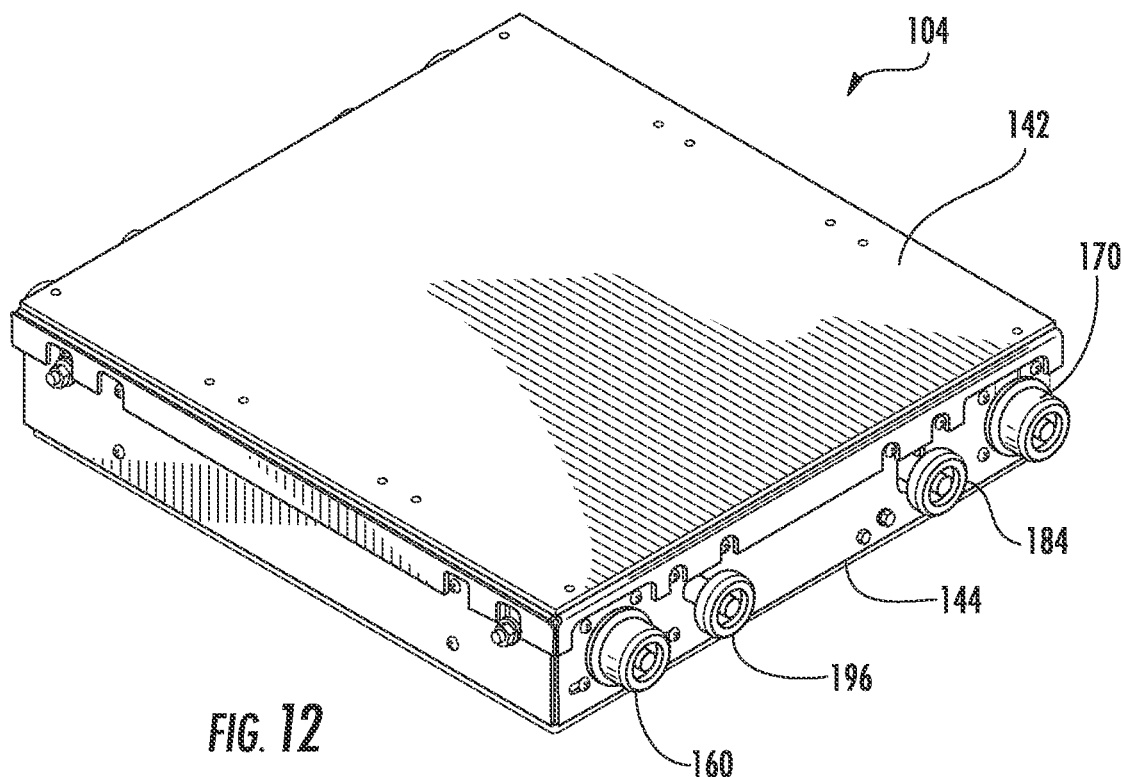
FIG. 12 shows a perspective view of a row cart according to certain aspects of the disclosure.
Figure 13:
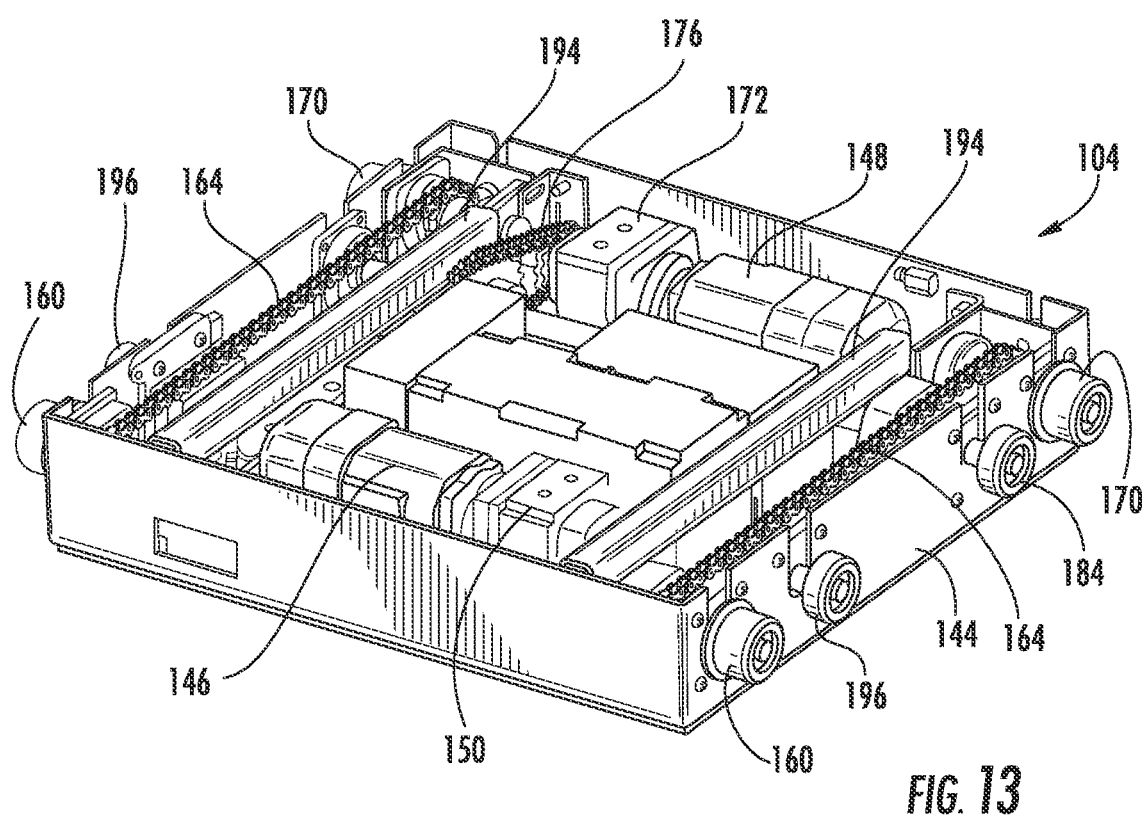
FIG. 13 shows a perspective view of the row cart of FIG. 12 with its top platform removed to display internal elements.
Figure 14:
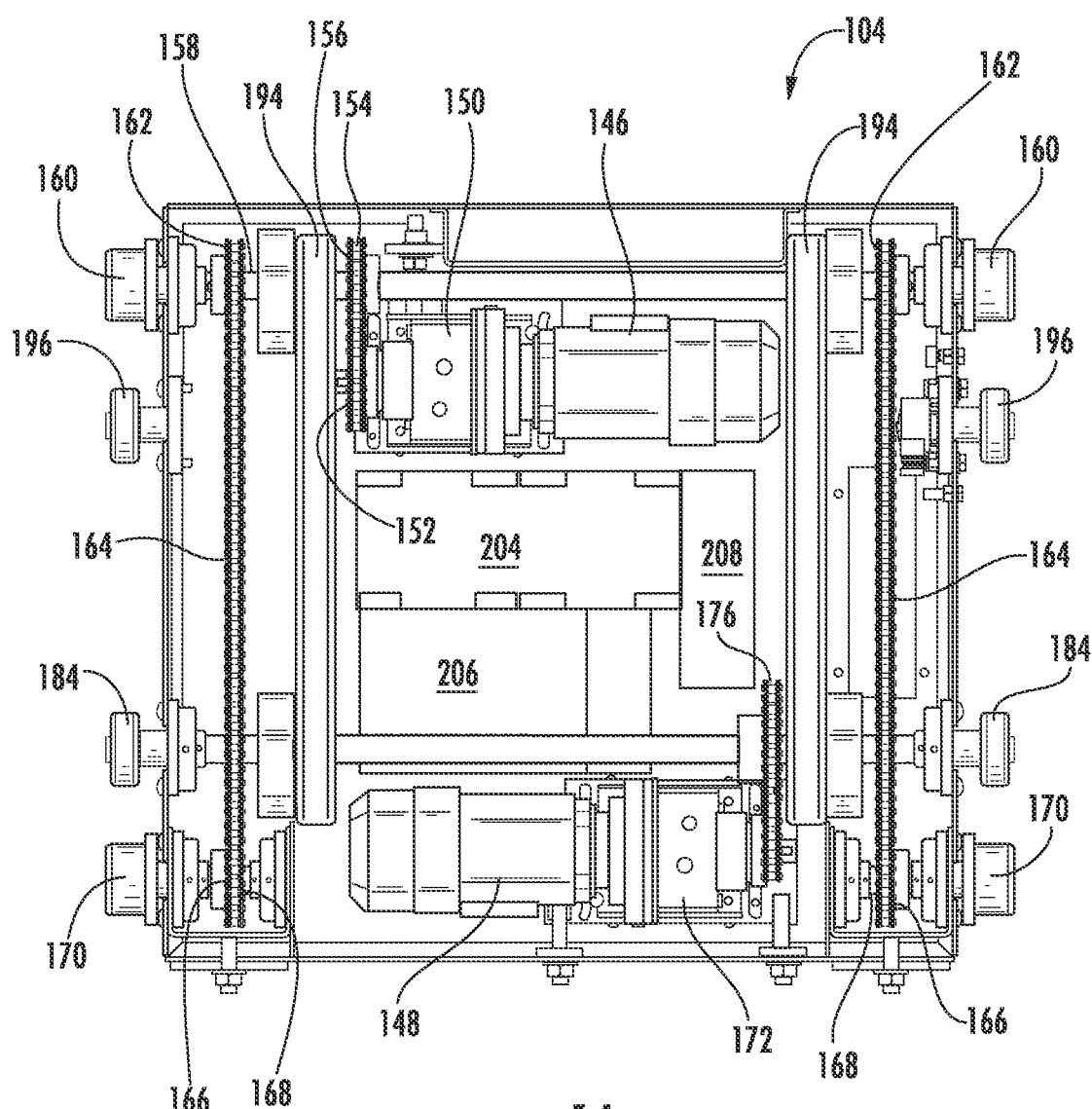
FIG. 14 shows a top view of the row cart of FIG. 12 with the top removed.
Figure 15:
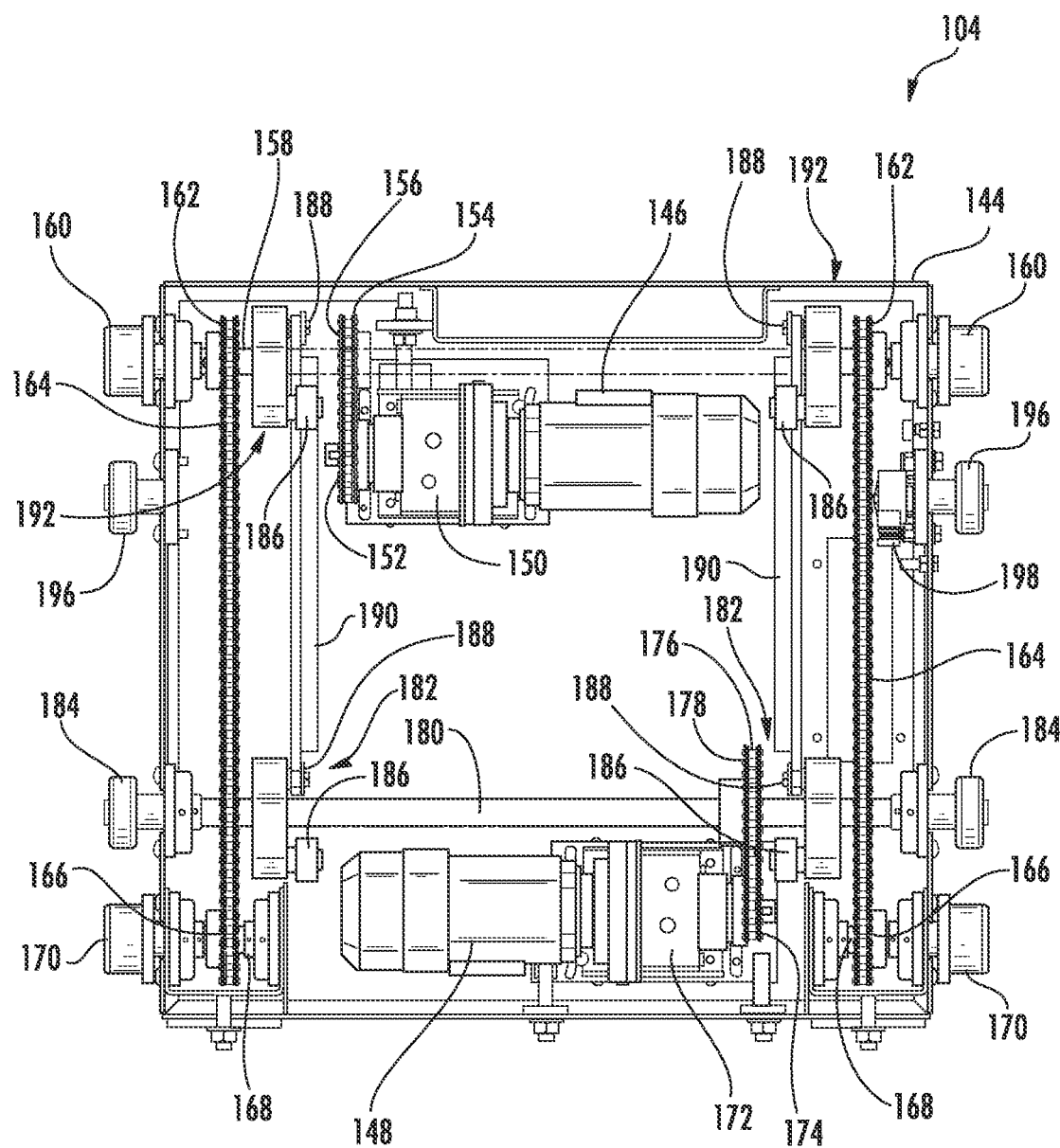
FIG. 15 shows a top view as in FIG. 14 with lifting bars further removed.

FIG. 8 shows one example of a dual shuttle 100 useful in the present system and methods. As shown, dual shuttle 100 includes a first (aisle) cart 102 (FIGS. 8-11) and a second (row) cart 104 (FIGS. 8 and 12-17) that can be carried on or driven off the aisle cart. Track portions 106 on aisle cart 102 are sized to complement track sections 56 of rack 50 allowing row cart 104 to drive on or off the aisle cart.

Aisle cart 102 includes two motors 108 and 110. Motor 108 drives aisle cart 102 up and down track elements 90 of the respective aisle 86 in which the cart is located. Motor 110 drives a conveyor 112 on aisle cart 102 for loading and unloading items onto the aisle cart. It should be understood that conveyor 112 could also be located on row cart, if desired. Also, it should be understood that conveyor 112 can place items directly onto aisle cart 102, or can place items on row cart 104 nested within the aisle cart, both of such modes being considered moving the items onto the aisle cart and/or moving the items onto the dual shuttle. Accordingly, as discussed in greater detail below, various configurations and modes of operation are possible within the scope of the present invention.

Both motors 108,110 can be powered by an energy storage device such as a battery, capacitor, a combination of a battery and capacitor, or the like charged by suitable electrical connections (see FIGS. 23-26) in rack 50. If desired, even though an energy storage device that would output DC current could be employed, motors 108,110 can be AC motors, used with an inverter. Use of such AC motors with an inverter may provide a less expensive alternative than use of a DC motor.

Also, as discussed below, aisle cart 102 can receive three-wire single phase or three-phase AC power directly from track elements 90 via an electrified rail/wiper system. Use of such direct powering allows aisle cart 102 to be constantly and fully electrified, without need for charging. Also, the weight and space used by the energy storage devices, inverter, etc., can be eliminated from each aisle cart 102. Because aisle carts 102 each traverse only one dedicated aisle 86, electrifying the aisles with a track (see FIGS. 23-26) and wiper contact interface is a cost effective solution for powering aisle carts 102.

Motor 108 is connected to a gear box 114 with an output gear 116 that drives a chain 118 that drives an input gear 120 of a shaft 122. Wheels 124 are mounted to shaft 122. Wheels 126 mounted on shaft 128 may be idlers. By operating motor 108 in one way or the other, wheels 124 are rotated clockwise or counterclockwise, thereby moving aisle cart 102 up and down an aisle in the rack. If desired an encoder or the like may be attached to one of the wheels, shaft, motor, gearbox, etc., to provide feedback and control as to location of cart 102 along the aisle. Alternatively or in addition, external detection devices such as optical or laser detectors, rfid elements, etc., may be used for position sensing and control. Cart 102 may include a wireless communication device (not shown) for communicating with a controller for the system to receive signals and provide feedback as to desired tasks, locations, etc.

Motor 110 is connected to a gearbox 129 having a drive gear 130 that drives a chain 132. An input gear 134 of shaft 136 is rotated by chain 132. Two output gears 138 on shaft 136 drive chains 140 of loading/unloading g conveyor 112. Accordingly, driving motor 110 one way or the other causes chains 140 to move one way or another. Such motion of chains 140 can be used to pull items onto or push items off aisle cart 102 when desired. As shown in FIG. 8, when row cart 104 is nested within aisle cart 102 with its top surface 142 in a retracted (not raised) position, chains 140 are higher than the top surface. Therefore, movement of chains 140 of loading conveyor 112 with row cart 104 in place allows a load, pallet, etc., to be moved onto aisle cart 102 without interference by row cart 104. However, carts 102 and 104 could be configured or operated differently, so that chains 140 move a load onto cart 104, either initially or after lifting top surface 142 of cart 104, as discussed below. Therefore, although the description herein shows pallets 84 being supported on chains 140 located on aisle carts 102, the pallets could at times be supported by row carts 104 when the row carts are on aisle carts.

An example of a row cart 104 is shown in FIGS. 12-17. Row cart 104 includes a frame 144 and movable top surface 142 forming a platform for receiving loads. Within frame 144 are two motors. Motor 146 drives cart 104 along rows 88 and motor 148 moves top surface 142 up and down. Motor 146 drives a gearbox 150, an output gear 152 and a chain 154. Chain 154 drives an input gear 156 of shaft 158 on which driven wheels 160 are mounted. Output gears 162 drive chains 164 that drive input gears 166 of shafts 168 to drive driven wheels 170. Accordingly, driving motor 146 in one direction or another rotates wheels 160 and 170 clockwise or counterclockwise, thereby moving row cart 104 along a row 88, or onto or off aisle cart 102.

Motor 148 lifts top surface 142 off cart 104 when desired to lift an item off either loading conveyor 112 of cart 102 or a position within storage rack 50. Motor 148 drives a gearbox 172 and an output gear 174 to drive a chain 176. Chain 176 drives input gear 178 mounted to shaft 180, to which camming elements 182 are attached for rotation with shaft 180 around a substantially horizontal axis. Wheels 184 are idlers that move independently of shaft 180. Camming elements 182 include lifters 186 which may be in the form of a wheel or the like. Pins 188 and bars 190 connect camming elements 182 with similar camming elements 192 at the other end of frame 144. If desired, a track element 194 (see FIG. 14, removed in FIG. 15 for clarity) may extend between camming elements for attachment to or contact with surface 142 when lifters 186 are activated. Wheels 196 are idlers and an encoder 198 may be attached for rotation with one of the wheels 196 or elsewhere to track position, as discussed above. Use of eight wheels on each row cart 104 assists in keeping the row cart stable when driving between row cart 102 and a row 88.

Figure 16:
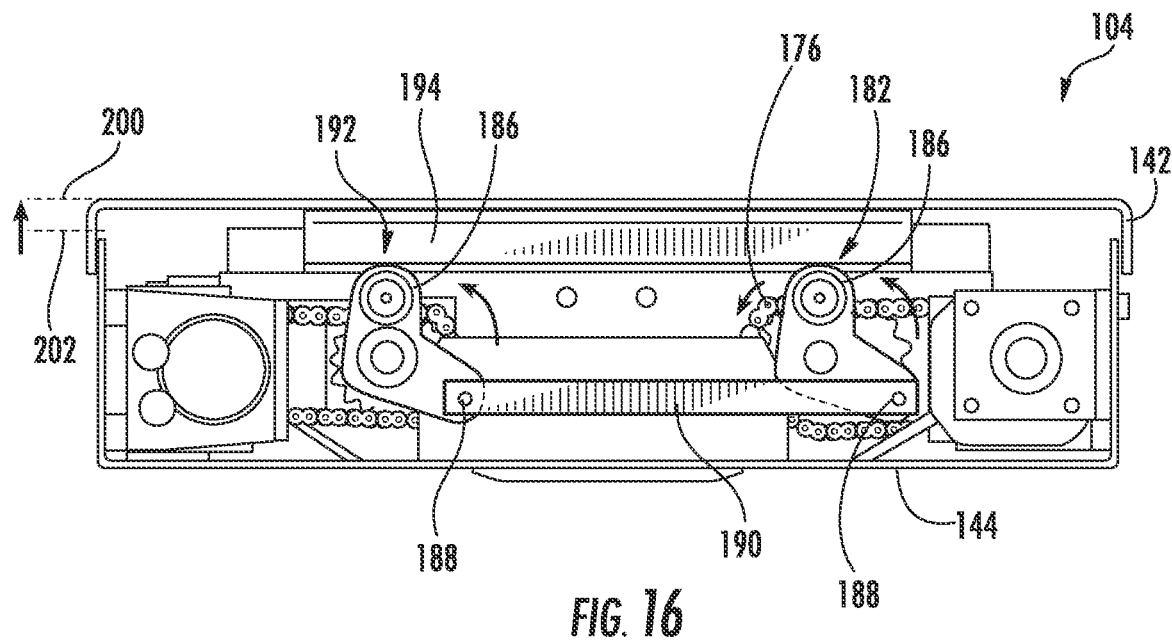
FIG. 16 shows a side diagrammatical view of the row cart of FIG. 12 showing the top platform in a raised orientation.
Figure 17:
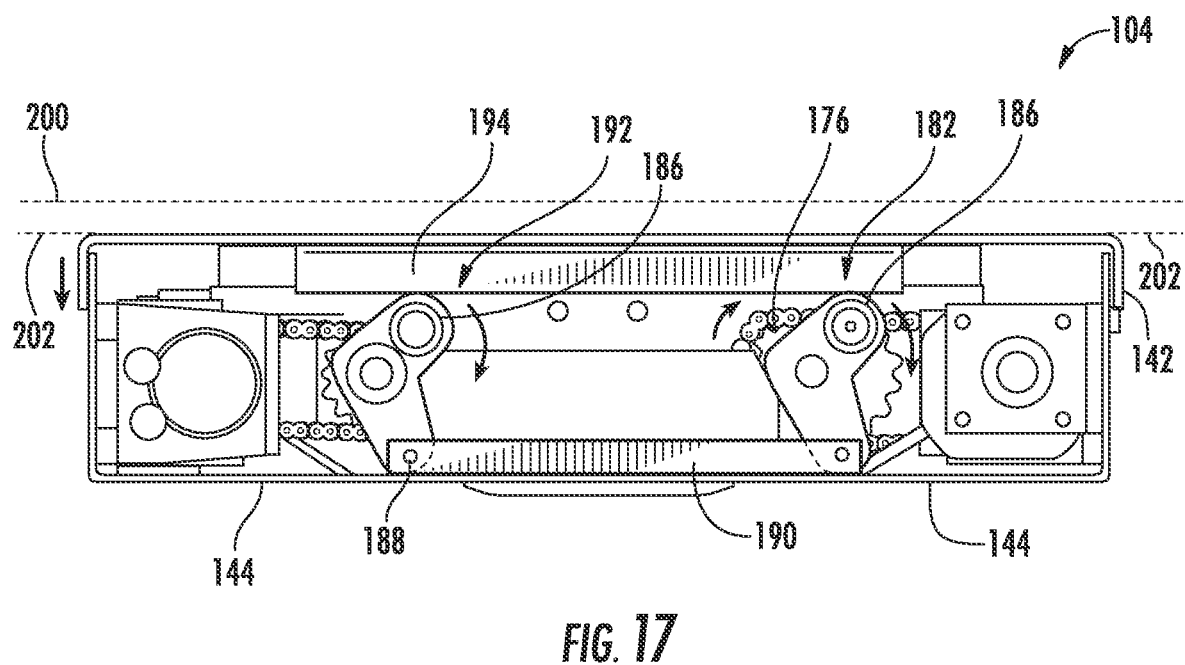
FIG. 17 shows a side diagrammatical view as in FIG. 16, with the top platform in a lowered orientation.
Figure 18:
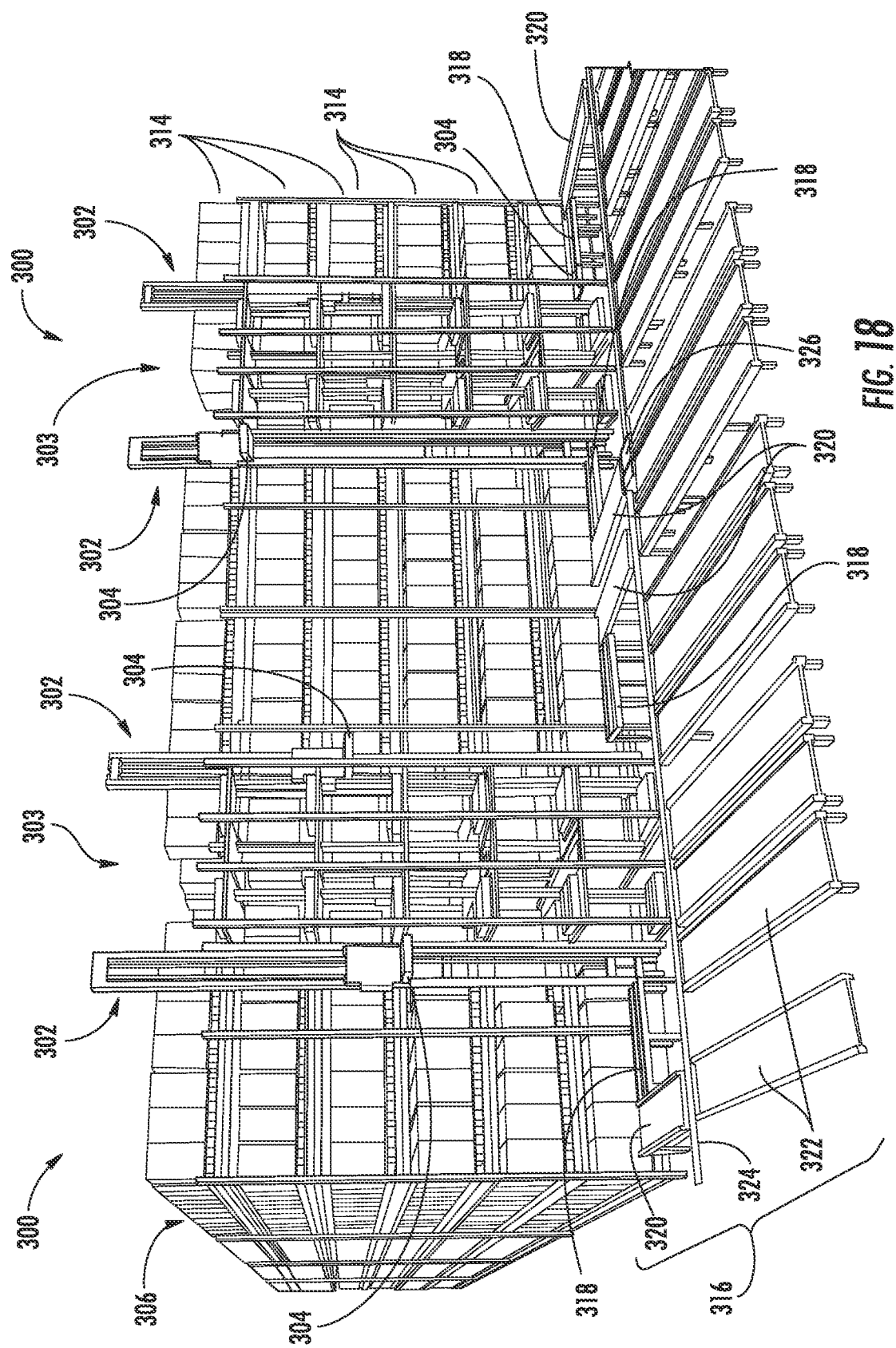
FIGS. 18-22 show sequential schematic views of a pallet loading function using a rack system as in FIG. 1 and a dual shuttle as in FIG. 8.
Figure 19:
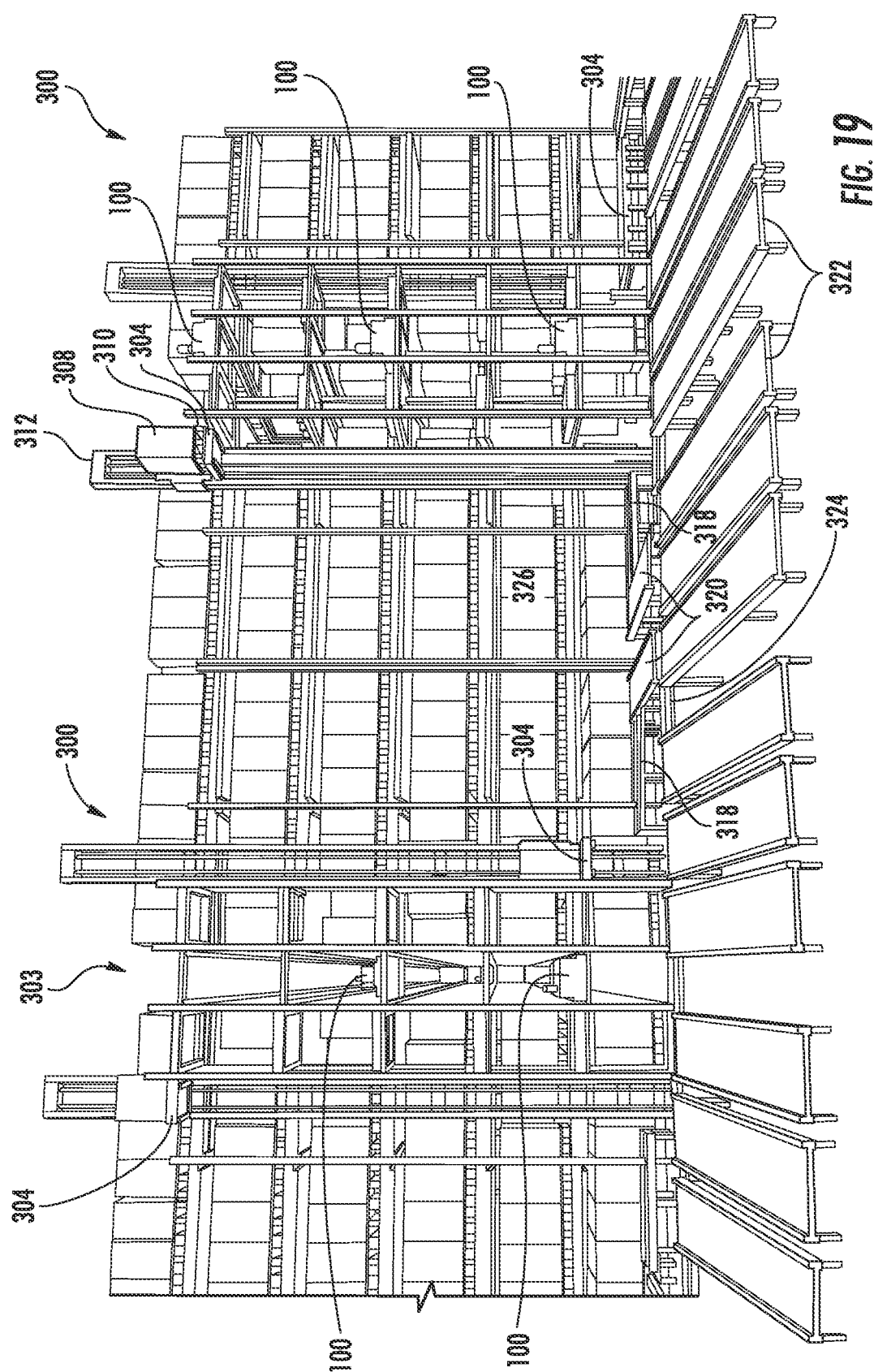

FIGS. 16 and 17 show schematically the lifting of top surface 142 off frame 144 of row cart 104. As shown, rotation of motor 148 a small distance causes chain 176 to move camming elements 182 and camming elements 192 (via bars 190). Accordingly, wheels 186 are moved so as to raise or lower top surface 142 via track elements 194. FIG. 17 shows the top surface 142 below the raised level 200, which is higher than the level 202 of loading conveyors 112 on aisle cart 102 when the carts 102 and 104 are nested, and higher than the level of track portions 56 on which loads are placed.

It should be understood that the gears, chains, etc., used to drive the various components in carts 102 and 104 could be modified in various ways. For example, multiple motors could be used instead of connecting multiple driven items by chains and gears. Therefore, the driving and lifting functions of the carts could be achieved in various ways within the scope of the invention.

Cart 104 may be driven via an energy storage device 204 such as batteries, capacitors, combinations or batteries and capacitors, or the like. Motors 146, 148 may be DC motors or may be AC motors if an inverter 206 and frequency converter 208 is used (all schematically shown in FIG. 14). For example, running a battery at 24 VDC through an inverter to create 230 VAC and a frequency converter to allow use of common 400 VAC motors can provide cost and maintenance savings. Batteries rated in the range of 24 Amp-hours provide suitable power to travel along rows 88 with loads with the duration of charging provided by contact with aisle cart 102, as described below. If energy storage device 204 includes a capacitor, it may be an ultra-capacitor providing a substantially equivalent output. Capacitors provide the benefit of quick charging of row cart 104, as described below, and accordingly can provide for alternate modes of operation.

Power can be provided to the dual shuttle 100 in various ways. For example, an electrified rail may be added along aisles 86 within rack 50 to constantly power aisle cart 102 or charge the energy storage device of the aisle cart, if desired. Since there are many fewer aisles 86 than rows 88, adding electrification to aisles only can be cost effective in some applications. Alternatively, charging could be provided at only one location or some locations along aisles. Such structure would require an energy storage device within aisle cart 102.

Similarly, row cart 104 can be charged via an electrified rail or via charge from a given location. If desired, aisle cart 102 and row cart 104 may have electrical contacts so that aisle cart can maintain charge on the row cart. As there are many more rows 88 than aisles 86, adding rail/wiper electrification to all of the rows while simplifying the row carts 104 so as to eliminate the energy storage device and related electronics may not be as cost effective as employing more electrically complicated row carts (with batteries or capacitors, for example) charged via aisle carts 102. However, if capacitors are used in row carts 104, placing a single charge contact located at an end of a row adjacent the aisle may be a suitable mode of charging the row carts. Capacitor charging occurs in a matter of seconds, and each time a row cart 104 passes the end of a row, it could pause just long enough for charging before or after moving onto or off the aisle cart 102, or charging could occur while the row cart is idle and the aisle cart is elsewhere. Alternatively, the capacitor charging contact in the row could be lengthy enough to charge row cart 104 while moving (without pausing) to make the system more efficient in terms of load moves per hour. Electrically connecting the carts 102 and 104 so that row carts 104 are charged by aisle carts 102, and aisle carts are charged via an electrified rail, may be the most cost effective solution in some applications, particularly those with battery powered row carts. However, it should be understood that various methods and systems of electrical delivery and usage are possible within the present invention.

FIGS. 18-22 show diagrammatically a large system, using two individual racks 300, much larger than rack 50, arranged side by side with a number of pieces of auxiliary equipment. For clarity, certain structure of the previous figures has been eliminated from FIGS. 18-22 so as to focus on overall layout and function.

As shown, racks 300 each include two lifts 302, one on either side of an aisle 303. Use of two lifts 302, particularly in a large system, optionally allows greater throughput. Each lift 302 includes a lift platform 304 onto which items 306 are placed, as illustrated goods/items 308 on pallets 310. Each lift platform 304 is moved up and down rack 300 along a frame 312 between layers 314 (in this case six, layers).

A system 316 of feed and delivery conveyors can be provided adjacent lifts 302 and racks 300. As shown, first conveyors 318 adjacent lifts 302 fed by second conveyors 320 can transfer items to and from the lift platforms 304. An array of third conveyors 322 can be provided along with a common conveyor 324. Third conveyors 322 can be used with individual vehicles, for example, for loading and unloading. Common conveyor 324 can use a transfer cart 326 similar to aisle cart 102 for receiving items from one of the third conveyors 322 and distributing it to one of the second conveyors 322 (or vice versa). The various conveyors disclosed can be driven or idler rollers, belt conveyors, chain conveyors, etc., as desired, with appropriate motor drives, in various possible orientations and arrangements. The logic and decision making for storage and retrieval of items in racks 300 can be controlled by various types of systems available from various sources, including ITW Warehouse Automation, using programmable logic controllers or the like. Accordingly, it should be understood that various different systems 316 for feed and delivery of items, as well as logic and management of items are all within the scope of the present invention.

Preferably, lift platforms 304 each include a motor driven conveyor 328 with at least one chain or belt similar to conveyor 112 on shuttle carts 100. Lift conveyors 328 can be used to move items onto or off lift platforms 304 when desired. If some spacing exists between lifts 302 and aisles 303, that can be taken up by a buffer conveyor 330. Each buffer conveyor 330 can also have one or more motor-driven conveyors 331 such as a chain, belt or the like, however the buffer conveyors could be idlers between the driven lift platform conveyors 328 and the aisles where shuttles 100 are located. If desired, all of the lift platforms 304, buffer conveyors 330 and shuttles 100 (aisle carts 102 and/or row carts 104) may include driven chain or belt conveyors on top surfaces for selectively moving items. Accordingly, a lift 302 can place an item on a buffer conveyor 330 in an upper layer when aisle cart 102 is not in a loading position at the end of aisle 303 next to the buffer conveyor, and then the lift can return to the base layer to retrieve another item while the aisle cart returns to retrieve the placed item. Multiple items can be located on a given buffer conveyor 330 while the dual shuttle carts 102/104 do their work placing other items, or while waiting for the lift 302 to return to pick them up to deliver them out of rack 300. If buffer conveyor 330 is used and is also motorized, when aisle cart 102 returns to the loading position, buffer conveyor 330 and aisle cart conveyor 112 can be activated simultaneously to pull the item onto the aisle cart. By loading aisle cart 102 using an onboard conveyor 112, row cart 104 need not be sent off and back on the aisle cart for loading, which saves time and energy within the row cart's batteries. Use of and/or motorizing buffer conveyor 330 further assists in this efficiency but is not required in all applications.

For example, in some conventional applications without an onboard conveyor such as conveyor 112 where a row cart leaves an aisle cart at a loading position of a rack system adjacent a lift or the like, an amount of time in the range of about 22-25 seconds is required to move a load from the lift to the aisle cart. In this time, the row cart must start moving off the aisle cart, accelerate, travel, decelerate, stop moving at the lift, pick up a load, start moving off the lift, accelerate, travel, decelerate, stop moving at the aisle cart, and then lower the load into the aisle cart. The time used by such activity impacts the number of pallet moves per hour. In some large rack systems with 1000-1500 items stored in approximately 50 sets of rows along an aisle, shuttle systems that load aisle carts using row carts as above make in the range of 20-25 pallet moves per hour. Such aisle cart loading activity also causes the row cart to be off the aisle cart twice per each pallet move (receiving the pallet and depositing the pallet), thereby using more energy per pallet move, causing a larger, heavier battery to be needed, due to both more activity and less opportunity for charging per pallet move.

Using the disclosed shuttle 100 with the loading/unloading conveyor 112 located on one of carts 102,104, the time needed to load a pallet at a loading position adjacent a lift in a system of the above size is reduced to the range of less than about 15 seconds and may be in the range of about 5-7 seconds. Therefore, if 15-20 seconds are saved per pallet move using the disclosed shuttle 100 with loading/unloading conveyor 112, several more pallet moves per hour are possible rendering the entire system more efficient and/or allowing the size of the rack serviced by a shuttle to be enlarged.

Efficiency in terms of pallet moves per hour can also be achieved by driving carts 102 and 104 faster than in conventional systems, of course within limits so as to not mishandle loads. For example, driving row carts 104 at a speed in the range of 4.0 m/s vs. a speed of 2.25 m/s as in certain available systems provides further pallet move per hour improvement. Acceleration and deceleration can be increased as well to the range of 0.5 m/s$^2$ from 0.17 m/s$^2$ as in certain available systems.

Accordingly, for a rack system sized as above (1000-1500 items per layer in 50 sets of rows along an aisle), pallet moves can be increased to a range of above 30 pallet moves per hour, and further to a range of 40-45 or greater pallet moves per hour, through use of the onboard loading/unloading g conveyor 112 and driving row carts 104 and/or aisle carts 102 faster. Therefore, pallet moves per hour for a given size rack can be more or less doubled using the various teachings of the present disclosure.

Further, simultaneous separate operation of row and aisle carts at least some of the time can help achieve some additional efficiency benefits. For example, if row carts 104 are not located on aisle carts 102 for charging while the aisle carts return from a row to the loading/unloading g area with a load (or to get a load), the row carts can be active simultaneously in a row to get or return a load. Simultaneous separate operation of row and aisle carts therefore can provide even further efficiency benefits or as many as 60 pallet moves per hour or more, when used with the above improvements as well. Such simultaneous operation may be achieved by allowing row carts 104 to be charged sometimes or always off aisle carts 102, for example in rows. Alternatively, such simultaneous operation could occur on a more limited basis if even if charging is done only on aisle carts 102. It should be understood that not all aspects of the disclosure need be used or used to the extent mentioned above in all applications within the scope of the invention. Further, improvement in function, stability, operation, etc., does not require an improvement in pallet moves per hour in all aspects of the invention.

Figure 22:
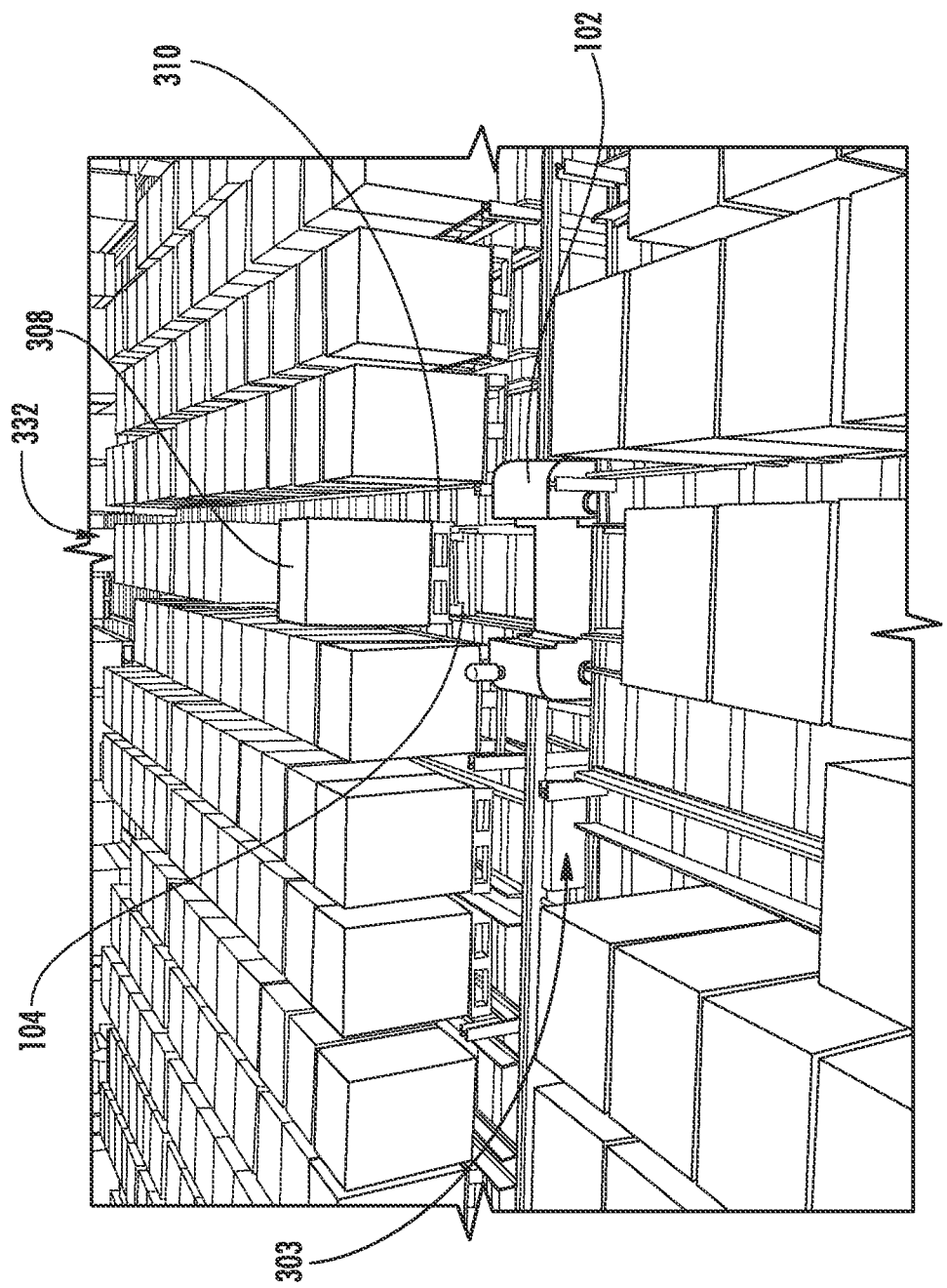
Figure 23:
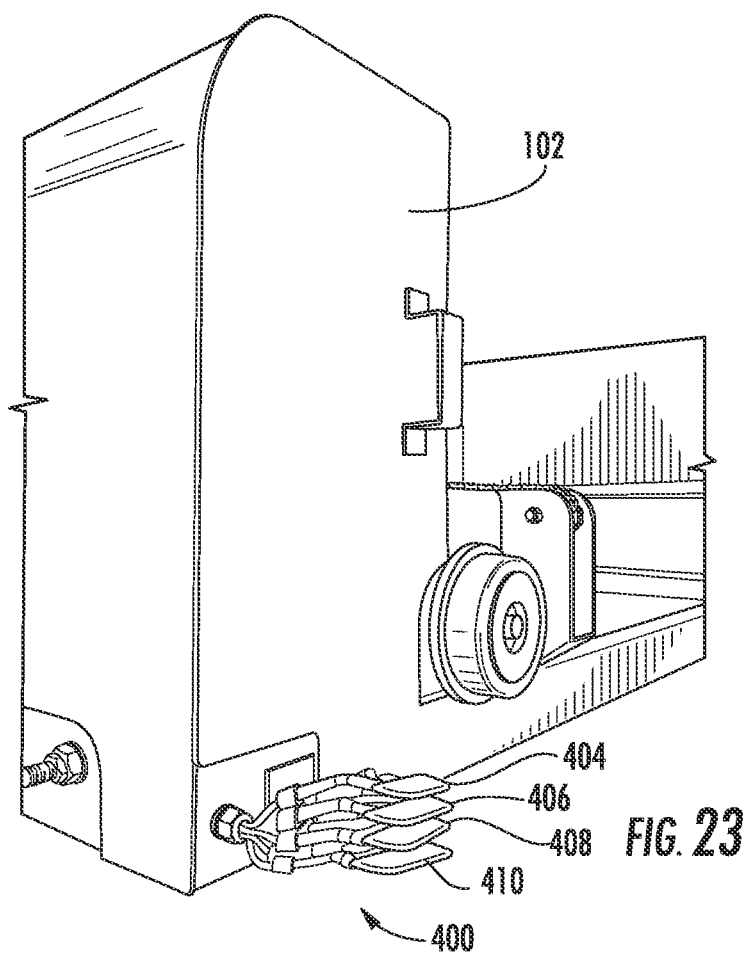
FIG. 23 shows a perspective view of a portion of an aisle cart showing electrical contacts for powering the aisle cart.
Figure 24:
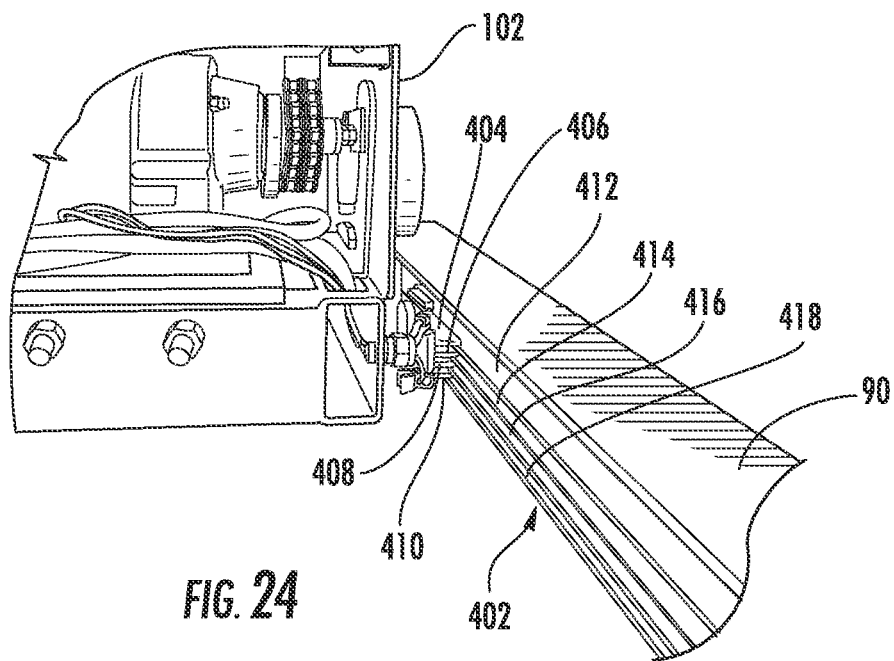
FIG. 24 shows a perspective view of the portion of the aisle cart of FIG. 23 contacting an electrified rail.
Figure 25:
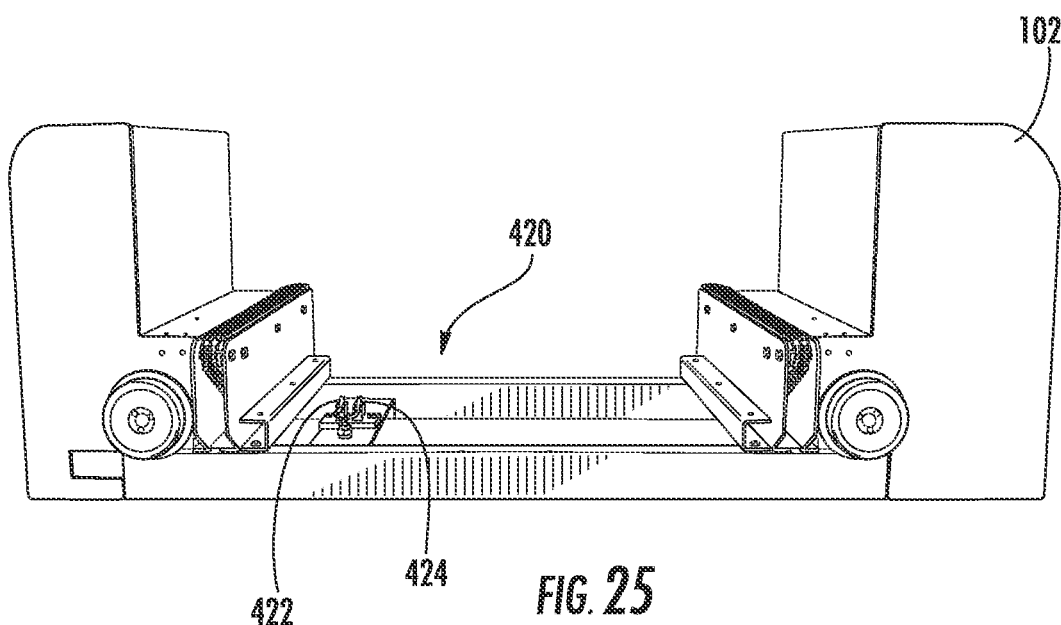
FIG. 25 shows a perspective view of an aisle cart showing electrical contacts for powering a row cart.
Figure 26:
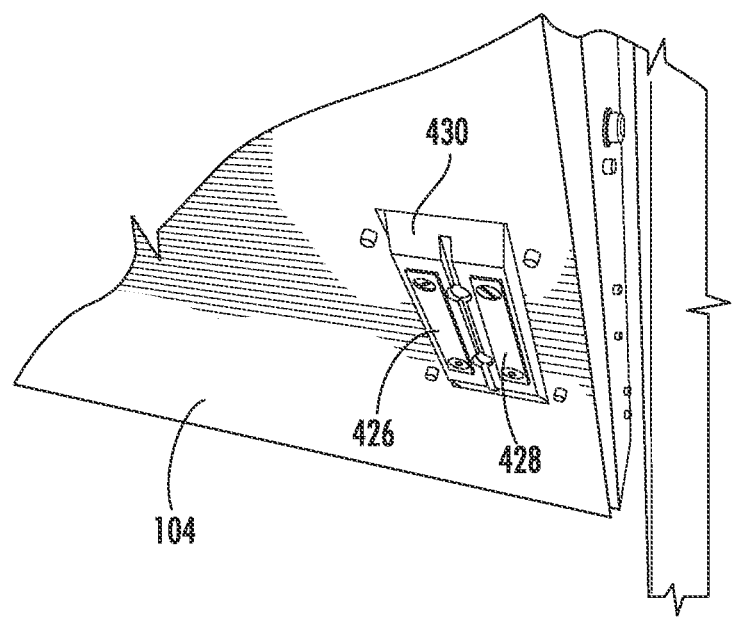
FIG. 26 shows a perspective view of a bottom portion of a row cart showing electrical contacts for receiving power from the electrical contacts on the aisle cart shown in FIG. 25.

FIGS. 18-21 show the use of lifts 302 and buffer conveyors 330 to get items onto dual shuttles 100 (including nested carts 102 and 104) at the loading position. FIG. 22 shows that dual shuttle 100 has traveled down an aisle 303 to a desired row 332. Row cart 104 has raised its upper surface 142 to lift the item off conveyors 112 of aisle cart 102 and has left the aisle cart to deliver the item to a desired location in the row 332. Aisle cart 102 may wait for row cart 104 or may return to the lift area for another load while the row cart operates. After reaching the desired location, row cart 104 will lower its upper surface 142 to place the item. Row cart 104 may then return down the row to nest within aisle cart 102, if the aisle cart is waiting for the row cart, or to wait for the aisle cart to return. Aisle cart 102 will then either move down aisle 303 to a different row to retrieve an item from storage, sending row cart 104 out to do so, or return to the loading area at the end of the aisle to obtain an additional item to place into storage, or allow row cart 104 to take a load to the present row or a different row if the aisle cart had left to get another load while the row cart was operating. These patterns repeat as controlled by the master controller of the entire automated warehousing system, as desired.

The retrieval of items from the rack is essentially the same pattern in reverse. Row cart 104 gets a load, carries it to the aisle cart 102, and the two carts return nested to the loading/unloading position at the end of the aisle. At that point, conveyor 112 drives the load off the shuttle 100.

As stated, to achieve greater pallet move per hour efficiency, carts 102 and 104 need not always be nested when aisle cart 102 moves between to the rows and the loading/unloading position at the ends of the aisles. Therefore, during a storing operation, as soon as row cart 104 leaves aisle cart 102 with a load, the aisle cart could return to the loading area to get another load. Aisle cart 102 could then return to retrieve row cart 104, which would drive onto the aisle cart beneath the second load. If the second load is to be placed in the same row, row cart 104 could place the load in the row, and the process could repeat. Similar function can occur during retrieval, as aisle cart 102 can be moving a retrieved load down the aisle to the loading/unloading g position while row cart 104 is moving along a row to get the next load, either in the same row as previously or a different row (as dropped off by the aisle cart).

However, operation of the row cart and aisle carts separately in such fashion reduces the nested time of the row cart on the aisle cart. If row cart 104 is to be powered and charged by contact only with aisle cart 102, only a limited, defined amount of usage time off the aisle cart is advisable before the energy storage device in row cart 104 would be drained. The overall control system can optionally monitor and control such operation if needed to limit such operation in various ways, such as to allow only a certain number of row cart trips per hour, to require a certain amount of nested time per hour, to allow for only a certain number of successive row trips or row trips only a certain distance from the loading area or from each other, etc. Such limitations might not be needed if row carts 104 are charged or powered by wiping contact with electrified rails on rows or other method apart from nesting on aisle carts 102. Row carts 104 can operate more independently from aisle carts 102 if they have a capacitor or ultra-capacitor based energy storage device, as such can be charged quickly by charging pads in the rows, either instead of or in addition to charging on the aisle carts.

FIGS. 23-26 show one example of electrical connections that could be used to power the aisle and row carts. As shown, aisle cart 102 can include an electrical contact 400 in the form of a brush, wiper, etc., for receiving power from an electrified track 402 on the side elements 90 forming part of the aisle cart track. As shown, brush 400 has four contacts 404, 406, 408, 410, that can be used to contact individual elements 412, 414, 416, 418 on track 402 for three-phase power AC supply plus ground. If desired, single-phase AC power could also be provided with positive/negative connections plus ground. Using a sliding connection in this fashion may be simpler than providing a cable connection to aisle cart 102 in some applications, although that could also be employed as an option.

A contact 420 on top of aisle cart 102 includes two spring-loaded elements 422, 424 for contacting two plates 426, 428 on an electrical connector portion 430 of row cart 104. The storage element (battery and/or capacitor) on row cart 104 can be charged whenever it is located on aisle cart 102 via contact between elements 422, 424 and plates 426,428. The location of elements 422,424 and plates 426, 428 can be reversed between the carts. Alternatively, instead of placing elements 422, 424 (or 426,428) on aisle cart 102, such elements could be placed in the rack, for example in the center of the end of each row adjacent the aisle. Such location could be particularly useful if capacitors or ultra-capacitors are employed as an energy storage device within carts 104. As a further alternative, row carts 104 could employ a wiper and track system as disclosed for aisle carts 102 above for direct powering or charging or an energy storage device. Various devices suitable for making the electrical connections between the aisle cart track 90 and aisle cart 102, and between the aisle cart and row cart 104 or rack, are available from Vahle Electrification Systems.

Use of such power delivery systems allowing the row carts 104 to be charged on the aisle carts 102 and/or within rack, while also driving the row carts off the aisle carts to go up and down rows and not to have to load or unload at the loading locations at the lift platforms 304, provides various benefits. First, the system can move more loads per hour, as using the lift conveyor 328 and optional buffer conveyor 331 chains to move loads between the lifts and dual shuttle is generally faster than driving the row cart 104 back and forth off the aisle cart 102 to do so. Also, keeping the row cart 104 on the aisle cart 102 for more time provides more time within a duty cycle for charging and/or allows for use of a smaller storage device in the row cart, thereby potentially providing cost savings for the storage device and the motor used to drive it. However, within certain aspects of the invention even if a row cart 104 is driven off an aisle cart 102 to load and unload items at a loading/unloading position the end of the aisle, other disclosed structures and methods above provide other benefits within the scope of the present invention.

In view of the above, a rack, a dual shuttle, an aisle cart, a row cart, and an automated warehousing system are disclosed having various benefits. Further, methods of use of such items are disclosed. The systems may allow for a more rapid storage and retrieval of items, may employ smaller and more efficient carts, and may be easier to assemble and use. Numerous benefits are provided by the various disclosed subject matter curing at least some of the drawbacks posed by conventional systems.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An item-storage method comprising:
   lifting, via a lift, an item to a designated layer of multiple vertically spaced layers of a storage rack, wherein the designated layer comprises an aisle and multiple rows intersecting the aisle;
   moving the item off of the lift and onto a buffer conveyor on the designated layer by driving the buffer conveyor and a lift conveyor of the lift;
   moving a shuttle along the aisle to the buffer conveyor, wherein the shuttle comprises a first cart comprising a shuttle conveyor, and wherein moving the shuttle along the aisle to the buffer conveyor comprises moving the first cart along the aisle to the buffer conveyor;
   moving the item off of the buffer conveyor and onto the shuttle by driving the buffer conveyor and the shuttle conveyor;
   moving the shuttle along the aisle to a designated one of the rows, wherein moving the shuttle along the aisle to the designated row comprises moving the first cart along the aisle to the designated row; and
   moving the item off of the shuttle and along the designated row to a storage location in the designated row, wherein moving the item off of the shuttle along the designated row and to the storage location comprises:
   moving the item off of the first cart via a second cart; and
   moving the second cart along the designated row to the storage location.

2. The item-storage method of claim 1, wherein moving the item off of the first cart via the second cart comprises:
   while the second cart is received on the first cart and a top surface of the second cart is in a lower position in which the top surface is below the shuttle conveyor, moving the top surface to an upper position so the top surface engages the item and lifts the item off the shuttle conveyor.

3. The method of claim 2, wherein the shuttle conveyor comprises a first endless-loop conveyor, and wherein driving the shuttle conveyor comprises operating a driving motor to cause the first endless-loop conveyor to move to cause the item to move.

4. The method of claim 3, wherein the shuttle conveyor further comprises a second endless-loop conveyor spaced-apart from the first endless-loop conveyor such that the top surface of the second cart is between the first and second endless-loop conveyors when the second cart is received on the first cart.

5. The method of claim 2, wherein the second cart is on the first cart as the first cart moves along the aisle to the buffer conveyor.

6. The method of claim 2, further comprising moving the second cart onto the first cart after the first cart reaches the designated row.

7. The method of claim 1, further comprising moving the item off of the lift and onto the buffer conveyor on the designated layer by driving both the buffer conveyor and the lift conveyor.

8. The method of claim 7, further comprising moving the item off of the buffer conveyor and onto the shuttle by driving both the buffer conveyor and the shuttle conveyor.

9. The method of claim 1, further comprising moving the item off of the buffer conveyor and onto the shuttle by driving both the buffer conveyor and the shuttle conveyor.

10. An automated storage-and-retrieval system comprising:
    a storage rack comprising multiple vertically spaced layers including a designated layer, wherein the designated layer comprises an aisle and multiple rows intersecting the aisle;
    a lift configured to receive an item and to lift the item to the designated layer, the lift comprising a lift conveyor;
    a buffer conveyor on the designated layer and adjacent the aisle, the buffer conveyor sized to receive the item from the lift and to hold the item as the lift moves away from the buffer conveyor; and
    a shuttle movable along the aisle among the buffer conveyor and the rows, the shuttle including a shuttle conveyor, wherein the shuttle comprises a first cart comprising the shuttle conveyor and a second cart receivable on and movable with the first cart, wherein the first cart is movable along the aisle and the second cart is movable along the rows,
    wherein the lift conveyor and the buffer conveyor are configured to operate together to move the item off of the lift and onto the buffer conveyor, and
    wherein the buffer conveyor and the shuttle conveyor are configured to operate together to move the item off of the buffer conveyor and onto the shuttle.

11. The automated storage-and-retrieval system of claim 10, wherein the shuttle conveyor comprises a first shuttle conveyor and a second shuttle conveyor, wherein the first and second shuttle conveyors are spaced apart from one another such that the second cart is between the first and second shuttle conveyors when the second cart is received on the first cart.

12. The automated storage-and-retrieval system of claim 11, wherein the first and second shuttle conveyors comprise endless-loop conveyors.

13. The automated storage-and-retrieval system of claim 12, wherein the first and second shuttle conveyors comprise chain conveyors.

14. The automated storage-and-retrieval system of claim 10, wherein the second cart comprises a top surface movable relative to the shuttle conveyor between a lower position and an upper position, wherein the top surface is below the shuttle conveyor when in the lower position and above the shuttle conveyor when in the upper position.

15. The automated storage-and-retrieval system of claim 14, wherein the shuttle conveyor comprises a first shuttle conveyor and a second shuttle conveyor, wherein the first and second shuttle conveyors are spaced apart from one another such that the top surface of the second cart is between the first and second shuttle conveyors when the second cart is received on the first cart.

16. The automated storage-and-retrieval system of claim 15, wherein the first and second shuttle conveyors comprise endless-loop conveyors.

17. The automated storage-and-retrieval system of claim 16, wherein the first and second shuttle conveyors comprise chain conveyors.

\* \* \* \* \*